(12) United States Patent
Hermann et al.

(10) Patent No.: US 7,116,209 B2
(45) Date of Patent: Oct. 3, 2006

(54) STRAIN GAUGES

(75) Inventors: Jan Hermann, New South Wales (AU); Burkhard Raguse, New South Wales (AU); Torsten Reda, New South Wales (AU); Alan Richard Wilson, Victoria (AU)

(73) Assignees: Commonwealth Scientific and Industrial Research Organization, (AU); The Commonwealth of Australia as represented by The Defence Science and Technology Organization of the Dept. of Defence, Edinburgh (AU)

( * ) Notice: Subject to any disclaimer, the term of this patent is extended or adjusted under 35 U.S.C. 154(b) by 0 days.

(21) Appl. No.: 10/487,597

(22) PCT Filed: Aug. 26, 2002

(86) PCT No.: PCT/AU02/01133

§ 371 (c)(1),
(2), (4) Date: Jun. 24, 2004

(87) PCT Pub. No.: WO03/018307

PCT Pub. Date: Mar. 6, 2003

(65) Prior Publication Data

US 2004/0239475 A1    Dec. 2, 2004

(30) Foreign Application Priority Data

Aug. 24, 2001    (AU) .................................. PR7256

(51) Int. Cl.
*G01L 1/22*    (2006.01)

(52) U.S. Cl. ............................................. 338/2; 338/4

(58) Field of Classification Search ........... 338/2–6, 338/47, 25
See application file for complete search history.

(56) References Cited

U.S. PATENT DOCUMENTS

| | | | | |
|---|---|---|---|---|
| 2,598,407 | A * | 5/1952 | Marvel | 536/64 |
| 3,992,212 | A * | 11/1976 | Youtsey et al. | 106/1.14 |
| 4,506,250 | A * | 3/1985 | Kirby | 338/5 |
| 4,812,800 | A * | 3/1989 | Fuchs et al. | 338/2 |
| 5,302,936 | A | 4/1994 | Yaniger | |
| 5,446,286 | A * | 8/1995 | Bhargava | 250/361 R |
| 5,508,676 | A * | 4/1996 | Grange et al. | 338/2 |
| 5,541,570 | A | 7/1996 | McDowell | |
| 5,989,700 | A * | 11/1999 | Krivopal | 428/323 |
| 5,997,996 | A * | 12/1999 | Tamura | 428/209 |
| 6,103,868 | A * | 8/2000 | Heath et al. | 528/482 |
| 6,159,620 | A * | 12/2000 | Heath et al. | 428/615 |
| 6,458,327 | B1 * | 10/2002 | Vossmeyer | 422/68.1 |
| 6,512,445 | B1 * | 1/2003 | Schafert et al. | 338/2 |
| 6,555,024 | B1 * | 4/2003 | Ueda et al. | 252/511 |
| 6,586,483 | B1 * | 7/2003 | Kolb et al. | 521/91 |
| 2001/0036749 | A1 * | 11/2001 | Levert et al. | 438/758 |
| 2004/0026367 | A1 * | 2/2004 | Goebel et al. | 216/59 |
| 2004/0166673 | A1 * | 8/2004 | Hutchison et al. | 438/686 |
| 2004/0170822 | A1 * | 9/2004 | Rohrbaugh et al. | 428/323 |

FOREIGN PATENT DOCUMENTS

| | | |
|---|---|---|
| EP | 0 223 355 B1 | 10/1989 |
| GB | 2 192 186 A | 1/1988 |

* cited by examiner

*Primary Examiner*—Tu Hoang
(74) *Attorney, Agent, or Firm*—Nixon & Vanderhye

(57) ABSTRACT

The present invention provides a strain gauge comprising a resistive layer. The resistive layer comprises metallic or semiconducting nanoparticles or aggregates thereof in which the nanoparticles or aggregates thereof are separated by insulating and/or semiconducting material.

12 Claims, 5 Drawing Sheets

STRAIN GAUGES

This application is the U.S. National Phase of International Application PCT/AU02/01133, filed 26 Aug. 2002, which designated the U.S.

FIELD OF THE INVENTION

The present invention relates generally to the construction of strain gauges, and more particularly to highly sensitive and compact strain gauges based on films containing nanoparticles.

BACKGROUND OF THE INVENTION

Strain gauges measure the change in resistance of an electrical conductor associated with the application of a mechanical load to the conductor which results in a strain. This change in resistance can be due to changes in the geometry of the conductor and in the resistivity of the conductor material. Conventional strain gauges are based on metallic wires or foils or on micromachined single- or polycrystalline semiconductors. These gauges are usually attached to a flexible plastic substrate, which in turn is bonded to the structure for which the strain has to be determined. The sensitivity of a strain gauge is given by the gauge factor "G", which is defined as the ratio between the relative change in resistance "$\Delta R/R$" and the strain "$\epsilon$": $G = \Delta R/R/\epsilon$. For metallic strain gauges, the gauge factor has typical values of about $G=2$, while for semiconductor gauges, G is considerably higher and can reach values of 70–200. The monograph "*Strain Gauge Technology*" by Window and Holister describes the prior art in detail. The strain is typically measured in units of "microstrain" ("$\mu\epsilon$"); where $1\ \mu\epsilon = 10^{-6}\epsilon$.

Conventional strain gauge technology has a number of disadvantages. Metal wire and foil gauges have a limited sensitivity, which means that rather sophisticated measurement techniques are required to detect relative changes in resistance as low as a few ppm corresponding to low strains in the microstrain range. Furthermore, the resistivity of the conductor material of such gauges is rather low, resulting in increased power dissipation. This places restrictions on the minimum size of the gauge structure and thus on the spatial resolution of the strain measurements. Semiconductor-based gauges, on the other hand, while exhibiting higher sensitivities, suffer from non-linear behaviour, high temperature coefficients of resistivity, low strain limits and a complex (and thus costly) manufacturing process.

Fuchs et al. (U.S. Pat. No. 4,732,042, 1989) have described a strain gauge type based on a thin, granular metal film in which the conduction is governed by the tunnel effect between the metal grains. A theoretical description of this conduction mechanism together with experimental results for granular films of metals such as gold, silver, palladium or tin was given by Abeles et al. (Adv. Phys. 24, 407 (1975)). The granular films are produced using physical or chemical vapour deposition. The sensitivity of granular metal film gauges is comparable to that of semiconductor-based gauges.

SUMMARY OF THE INVENTION

The present inventors have found that highly sensitive strain gauges can be formed using layers composed of nanoparticles or aggregates of nanoparticles.

Accordingly the present invention consists in a strain gauge, the strain gauge comprising a resistive layer, the resistive layer comprising metallic or semiconducting nanoparticles or aggregates thereof in which the nanoparticles or aggregates thereof are separated by insulating and/or semiconducting material.

In the strain gauge of the present invention the resistive layer comprises metallic or semiconducting nanoparticles or aggregates thereof which are separated by insulating or semiconducting barriers. The conduction in the nanoparticle layer is governed by tunnelling between nanoparticles through these barriers. When the layer is deformed due to the application of an external mechanical load, the separation between the nanoparticles changes. Correspondingly, the tunnelling current and thus the resistance of the layer changes. The exponential dependence of the tunnelling current on the thickness of the tunnel barrier results in the high sensitivity of the gauges, which can be almost two orders of magnitude higher than that of metal foil gauges and is comparable to that of semiconductor-based gauges.

The tunnel barriers between the nanoparticles or aggregates of nanoparticles can be formed by organic molecules which either surround the nanoparticles or aggregates of nanoparticles to form capping layers in a self-assembling process, or which may cross-link nanoparticles or aggregates of nanoparticles. Alternatively, shells of inorganic materials (e.g. silica, cf. Alejandro-Arellano et al., Pure Appl. Chem. 72 257 (2000)) surrounding the nanoparticles can be used to function as tunnel barriers.

Examples of nanoparticles which may be used in the present invention include nanoparticles based on metal elements, e.g. Au, Ag, Pd, Pt, Cu, Fe, Co, Ni, etc; metal alloys, e.g. $Co_xFe_y$, $Co_xAu_y$, semiconductors, e.g. $TiO_2$, CdS, CdSe, ZnS, ZnSe, PbS, ZnO, CdTe, GaAs, InP, Si, ITO, etc; organic compounds, e.g. conducting polymers. The nanoparticles may be of the composite core-shell type where a core, e.g. Au, is surrounded by a shell of a different material, e.g. $TiO_2$.

The functionalising agents may be charged, polar or neutral. They include inorganic ions, oxides and polymers as well as organic aliphatic and aromatic hydrocarbons; organic halogen compounds, alkyl, alkenyl, and alkynyl halides, aryl halides; organometallic compounds; alcohols, phenols, and ethers; carboxylic acids and their derivatives; organic nitrogen compounds; organic sulfur compounds; organic silicon compounds; heterocyclic compounds; oils, fats and waxes; carbohydrates; amino acids, proteins and peptides; isoprenoids and terpenes; steroids and their derivates; nucloetides and nucleosides, nucleic acids; alkaloids; dyes and pigments; organic polymers, including insulating, semiconducting and conducting polymers; fullerenes, carbon nanotubes and fragments of nanotubes. Examples include 4-nitrothiophenol (4-NTP); mercaptoacetic or dithioglycolic acid; tetracyanoquinodimethan (TCNQ); 4-(4-nitrophenolazo-)resorcinol (magneson), zinc,5,10,15, 20-tetra-(4-pyridyl-)21H-23H-porphine-tetrakis(methchloride) (Zn-porphine); diphenylthiocarbazone (dithizone); alkyl dithiols (e.g. ethanedithiol, propanedithiol, butanedithiol, octanedithiol, etc.); thiourea; cystamine; tetramethyl-p-phenylenediamine (TMPD).

The nanoparticle layer can be produced by a variety of deposition techniques. Clearly it is preferable to use a deposition process which is reproducible and controllable, capable of producing homogeneous films based on a variety of nanoparticle types, capping agents and cross-linkers on different surfaces (specifically, on flexible substrates), and is rapid, scalable and economic. One such method was developed to form nanoparticle films on nanoporous substrates (Raguse et al., WO 01/25316). An alternative process produces stable concentrates of functionalised nanoparticles or cross-linked nanoparticle aggregates as inks for printing, spraying, drawing and painting processes, where the nanoparticles are functionalised with organic molecules or inorganic compounds. In this process, the nanoparticles or cross-linked aggregates of nanoparticles are coated with a protecting layer of organic molecules or inorganic compounds to halt aggregation of the nanoparticles or aggregates. Sols of the functionalised nanoparticles or aggregates of nanoparticles are concentrated using methods such as centrifugation, filtration, dialysis or precipitation, either once or repeatedly. During the concentration process residues, pollutants and excess protectant or cross-linker molecules are removed from the nanoparticle sols. The resulting concentrates can be printed, sprayed, painted or drawn to produce coherent nanoparticle films on rigid and flexible substrates.

Besides their high sensitivity, a further advantage of the nanoparticle layers compared to metallic films is their resistivity, which can be several orders of magnitude higher than that of metallic conductors. The higher resistance of the nanoparticle films is advantageous for several reasons. The power dissipation is reduced, since for a constant measuring voltage the power is inversely proportional to the resistance. As a result, higher excitations can be used or, alternatively, the length of the resistive path can be reduced. This means that either the sensor dimensions can be made smaller or that there is no need for patterning meandered structures. In either case, the spatial resolution of the strain measurement is improved. This facilitates the deposition of multiple strain gauges for the measurement of the in-plane strain components, and of arrays of strain gauges for mapping the strain distribution on the surface of structures and for similar non-destructive evaluation tasks.

The value of the resistivity of the nanoparticle films is determined by the thickness of the tunnel barriers. When this thickness is changed in a controlled fashion, the resistivity can be tuned to suit a particular application. This can be achieved most directly by varying the length of the organic molecules used to surround or cross-link the nanoparticles or aggregates of nanoparticles. Furthermore, changes in the concentration of the cross-linker molecule during the cross-linking process result in considerable variations in the layer resistance.

Similar to conventional strain gauges, the nanoparticle films can be deposited on flexible insulating substrates, e.g. nanoporous membranes or plastic sheets, which are then bonded to the structure to be tested using suitable adhesives. Patterning techniques can be applied during different stages of the deposition to define the desired conductor geometry and to realise multi-gauge circuits such as bridges or rosettes. Examples for such patterning methods include deposition through shadow masks, microstamping (Kumar et al., U.S. Pat. No. 5,512,131, 1996), photolithographic etching and lift-off techniques or laser patterning.

In the particular case of the deposition of a nanoparticle film by printing, drawing or spraying, there is the possibility of directly applying the resistive layer to the structure under test, provided the surface of the structure is insulating. In addition, these techniques open the possibility of producing strain gauges with very large dimensions (>10 m) for the characterisation of strains in large structures. This is not possible with semiconductor-based gauges, whose size is limited by the size of the semiconductor wafers used in their production to dimensions of about 300 mm.

For the purpose of connecting the resistive sensing layer to the circuit measuring the resistance, conductive contact pads or electrodes can be integrated into the strain gauge. This can be achieved by deposition of a conducting layer patterned in the appropriate shape before or after the deposition of the resistive nanoparticle sensing layer. Examples for the material of the conducting layer include, but are not limited to, metals, alloys, or other nanoparticle films of suitably high conductivity.

The surface of the strain gauge can be covered with a protective passivation layer, which may either be a flexible coating, e.g. a polymer coating (see, e.g., Adams et al., U.S. Pat. No. 4,732,042, 1988), or a flexible sheet that could be attached to the surface using appropriate adhesive or via a thermal lamination process.

DETAILED DESCRIPTION

Figure 1:
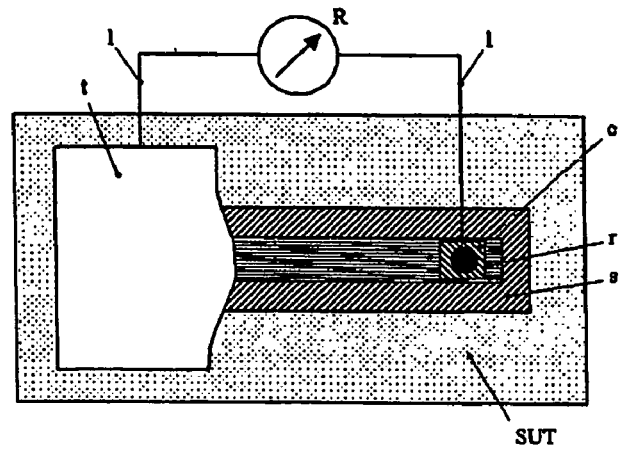
FIG. 1 is a top view of a tunnel strain gauge assembly which is attached to the surface under test ("SUT") using an adhesive layer "a" (obscured in this figure, see FIG. 2) and connected via the leads "1" (with optional solder beads) to an Ohmmeter "R". The strain gauge consists of an insulating substrate "s", onto which the resistive nanoparticle tunnelling layer "r" is deposited, and the contact pads "c", which are subsequently deposited onto the nanoparticle tunnelling layer "r". Also shown is an (optional) protective top layer "t" which is drawn partially cut away to reveal the gauge structure.
Figure 2:
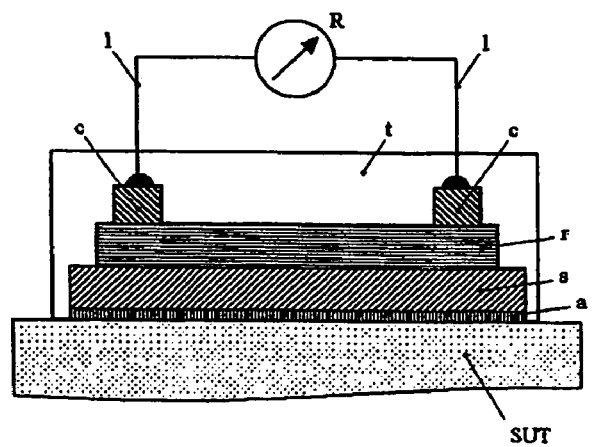
FIG. 2 is a side cross-sectional view of the tunnel strain gauge assembly shown in FIG. 1.
Figure 3:
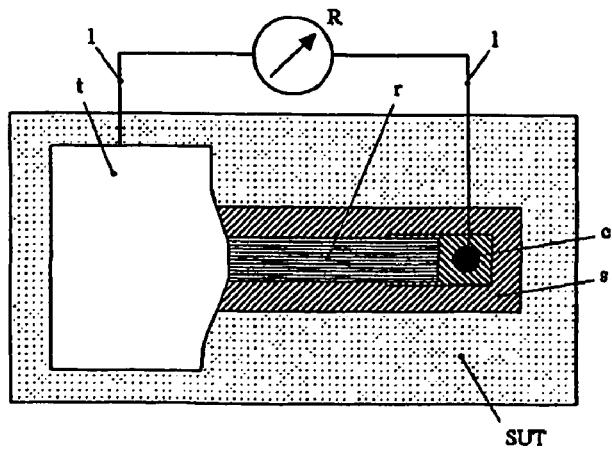
FIG. 3 is a top view of a tunnel strain gauge assembly which is attached to the surface under test ("SUT") using an adhesive layer "a" (obscured in this figure, see FIG. 4) and connected via the leads "1" (with optional solder beads) to an Ohmmeter "R". The strain gauge consists of an insulating substrate "s", onto which the contact pads "c" are deposited, and the resistive nanoparticle tunnelling layer "r", which is subsequently deposited onto (and partially covers) the contact pads "c". Also shown is an (optional) protective top layer "t" which is drawn partially cut away to reveal the gauge structure.
Figure 4:
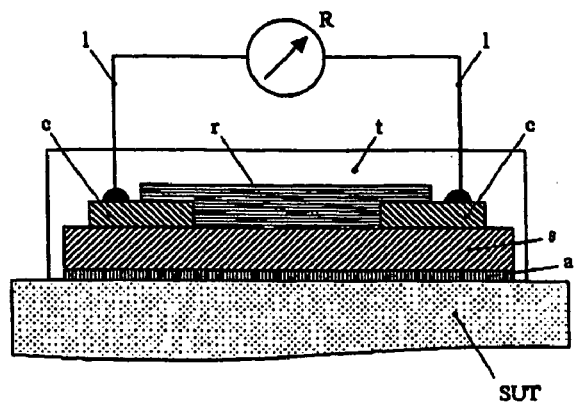
FIG. 4 is a side cross-sectional view of the tunnel strain gauge assembly in FIG. 3.

The tunnel strain gauge assembly principally consists of the resistive nanoparticle layer (labelled "r" in FIGS. 1 through 10) which is attached to the surface under test (labelled "SUT" in FIGS. 1 through 10). To perform the resistance measurement, an Ohmmeter (labelled "R" in FIGS. 1 through 10) is connected to the resistive layer via leads (labelled "1" in FIGS. 1 through 10) and contact pads (labelled "c" in FIGS. 1 through 10).

The nanoparticle material is typically gold or silver, with characteristic particle diameters ranging from 5 nm to 50 nm. The preparation of nanoparticles is described in the literature, eg. by Turkevich et al. (Discuss. Faraday Soc. 11, 55 (1951)) and Craighton et al. (J. Chem. Soc. Faraday Trans. 2 (75), 790 (1979)). Very few reliable and economic procedures for the formation of nanoparticle films have been reported so far. This is particularly true for the case of nanoparticle film deposition on flexible substrates. One example is the layer-by-layer described by Musick et al. (Langmuir 15, 844 (1999)). Raguse et al. (WO 01/25316) discloses a filtering process for the rapid precipitation of cross-linked nanoparticle films on nanoporous membrane substrates. Furthermore, using functionalised nanoparticle concentrates, nanoparticle films can be deposited onto a variety of rigid and flexible substrates using printing, drawing and spraying techniques. Examples for such concentrates include sols of gold or silver nanoparticles surrounded by protecting layers of capping agents such as 4-nitrothiophenol, or sols of aggregates of such nanoparticles cross-linked by agents such as alkyl dithiols, where the sols are subsequently concentrated, eg. by repeated centrifugation. These techniques provide solutions to the problem of producing nanoparticle films on flexible substrates which are suited for strain gauge applications.

The nanoparticle layer can be patterned to form an appropriate conductor geometry depending on the desired application. A variety of patterning techniques can be utilised to achieve this purpose. Deposition through shadow masks provides a simple and economic method to define structures with feature sizes of the order of 0.5 mm on virtually any substrate or structure. Photolithographic methods including both etching and lift-off processes allow to produce structures with feature sizes of the order of micrometers. These techniques are restricted to substrates which are compatible with the etchants and solvents used in the processes. Similar etching and lift-off methods are available where the structures are defined using microstamping (cf. Kumar et al., U.S. Pat. No. 5,512,131, 1996). Conductor configurations suitable for strain gauge applications include rosette arrangements and regular arrays. In the former case, multiple conductors are oriented along different directions in the plane of the surface under test with the purpose of simultaneously determining different strain components in that plane, while arrays of conductors can be used for mapping the strain distribution in the surface under test. An important conductor configuration which can be produced by appropriate patterning of the nanoparticle layer is the Wheatstone bridge. Details on the implementation of bridge circuits for strain gauges and a discussion of their respective advantages can be found in the literature, eg. in the monograph "*Strain Gauge Technology*" by Window and Holister.

Figure 5:
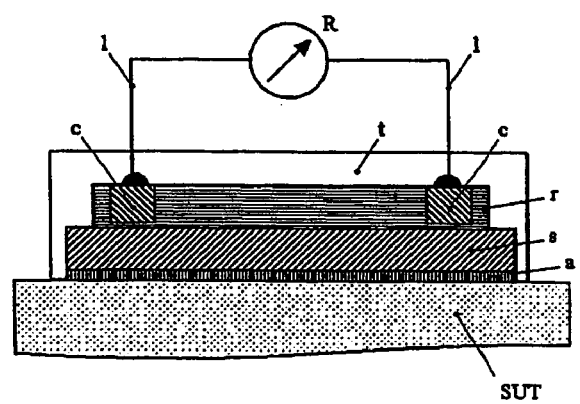
FIG. 5 is a side cross-sectional view of a tunnel strain gauge assembly similar to the one shown in FIG. 2 but with the electrical contact areas "c" now directly incorporated into the resistive layer "r".
Figure 6:
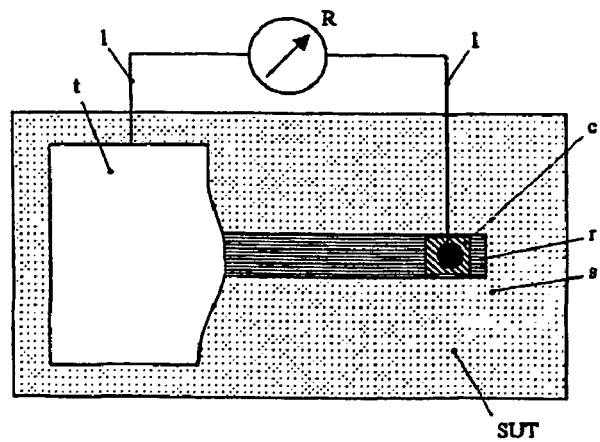
FIG. 6 is a top view of a tunnel strain gauge assembly similar to the one shown in FIG. 1 but with the difference that the resistive nanoparticle tunnelling layer "r" is directly deposited onto the surface under test ("SUT") without the need for a substrate and an adhesive layer.
Figure 7:
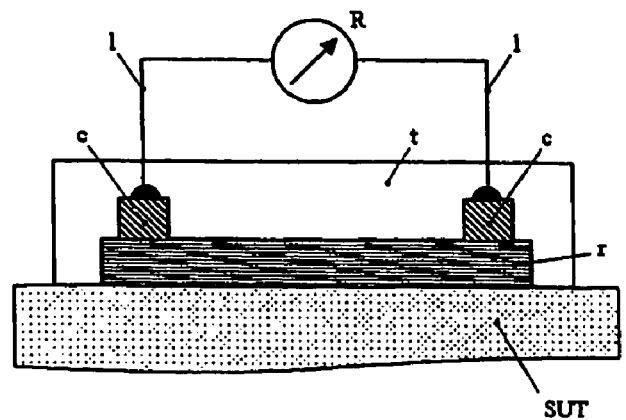
FIG. 7 is a side cross-sectional view of the tunnel strain gauge assembly in FIG. 6.
Figure 8:
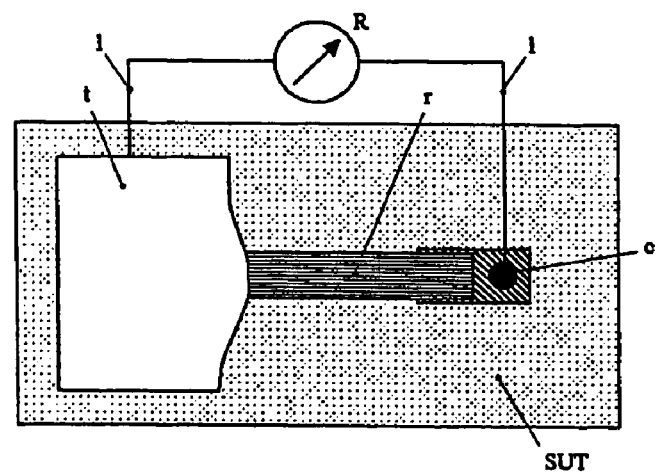
FIG. 8 is a top view of a tunnel strain gauge assembly similar to the one shown in FIG. 3 but with the difference that the resistive nanoparticle tunnelling layer "r" is directly deposited onto the surface under test ("SUT") without the need for a substrate and an adhesive layer.
Figure 9:
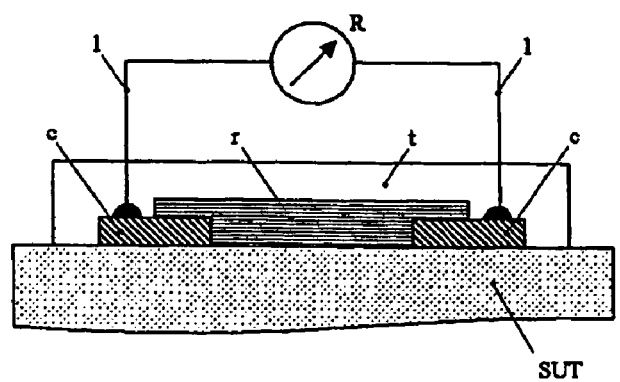
FIG. 9 is a side cross-sectional view of the tunnel strain gauge assembly in FIG. 8.
Figure 10:
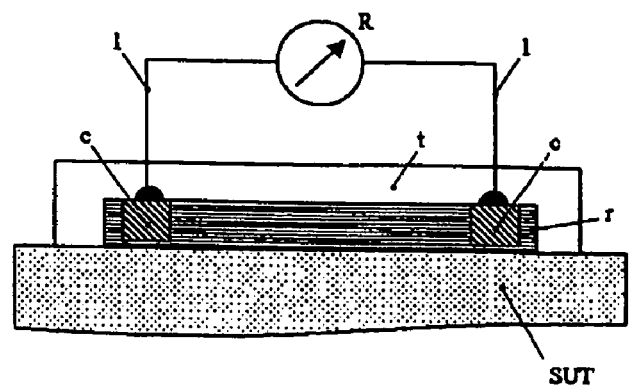
FIG. 10 is a side cross-sectional view of a tunnel strain gauge assembly similar to the one shown in FIG. 7 but with the electrical contact areas "c" now directly incorporated into the resistive layer "r".

The contact pads can either be added before the nanoparticle film has been deposited (cf. FIGS. 4 and 9), or after the nanoparticle film has been deposited (cf. FIGS. 2 and 7), or they can be directly integrated into the nanoparticle layer (cf. FIGS. 5 and 10). Addition of contacts can be performed using thermal evaporation of the contact material (e.g. gold or silver) or by using conductive paint. Direct integration can be accomplished by selectively exposing the future contact pad areas on the nanoparticle film to intense electromagnetic radiation in the UV/VIS/IR region, thus evaporating the material forming the tunnel barriers and effectively sintering or melting the nanoparticles. As a result of this selective irradiation process, the character of the conduction in the irradiated regions changes from tunnelling to ohmic and the resistivity drops considerably.

Typically, the resistive nanoparticle film forming the strain gauge will be deposited onto a substrate (labelled "s" in FIGS. 1 through 5), which in turn is bonded to the structure under test using an adhesive layer (labelled "a" in FIGS. 1 through 5). Where the nanoparticle film is produced from concentrates or inks using printing, drawing or spraying processes, the resistive layer can be deposited directly onto the structure under test (cf. FIGS. 6 through 10). This eliminates the need for intervening substrates and adhesive layers and allows the measurement of strains in surfaces with very small radii of curvature. It should be noted that this technique requires the surface of the structure under test to be insulating. If this condition is not met, a thin, insulating coating may have to be applied to the surface. Direct application of the strain gauge layer onto the structure under test by printing, drawing or spraying also allows the realisation of large-scale strain gauges with dimensions of the order of meters.

Finally, a protective top layer (labelled "t" in FIGS. 1 through 10) can be applied to seal the strain gauge assembly from environmental influences.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in the specification are herein incorporated by reference.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia before the priority date of each claim of this application.

In order that the nature of the present invention may be more clearly understood preferred forms thereof will be described with reference to the following Examples.

EXAMPLES

Example 1

A tunnel strain gauge was produced using a nanoparticle film based on a functionalised nanoparticle concentrate consisting of gold nanoparticles with an average diameter of 18 nm which were surrounded by self-assembled capping layers of 4-nitrothiophenol (4-NTP). The film was sprayed onto an ink jet transparency with a thickness of 0.14 mm as a substrate using an airbrush.

Thin gold wires (diameter 0.05 mm) were attached to the film using silver paint in order to connect the gauge to an Ohmmeter. The separation between the contacts was 6 mm, and the width of the gauge film was 5 mm. Since the room temperature resistance of the unstrained gauge was ca. 250 k$\Omega$ and the resistance of the leads was of the order of 1 $\Omega$, a two-point resistance measurement was sufficient.

Figure 11:
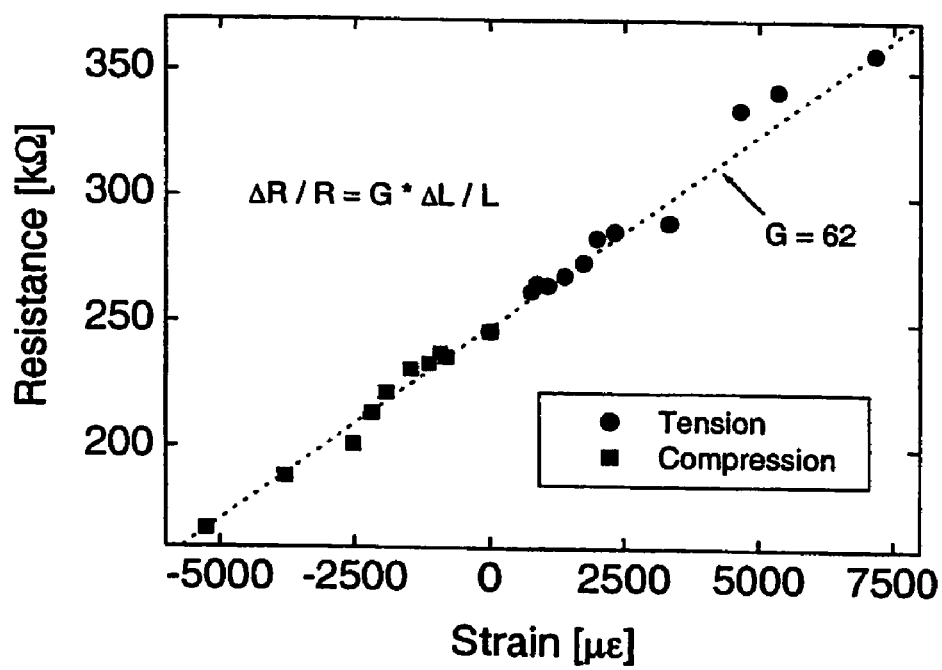
FIG. 11 is a plot of the resistance of a nanoparticle film strain gauge as a function of both compressive and tensile bending strain. The film consists of 18 nm gold nanoparticles with a 4-nitrothiophenol (4-NTP) capping layer on a flexible polyimide substrate.

To assess the sensitivity of the nanoparticle tunnel strain gauge, the gauge was attached to surfaces with different radii of curvature, thus exposing the gauge to varying bend strains. Both compressive and tensile strains were applied. FIG. 11 shows the measured resistance as a function of the bend strain. The resistance is an approximately linear function of the strain for strains of up to 7500 $\mu\epsilon$ and behaves reversibly as the strain is reduced and/or reversed. The gauge factor $G=\Delta R/R/\epsilon$ is about 60, which is between one and two orders of magnitude higher than that of metal wire and foil strain gauges and comparable to that of semiconductor strain gauges.

Example 2

A tunnel strain gauge was produced using a nanoparticle film deposited with the technique described by Raguse et al. (WO125316A1, 2001). The film consisted of gold nanoparticles with an average diameter of 8 nm which were cross-linked by $C_2$-dithiol. The film was deposited onto a nanoporous fluoropolymer (PVDF) membrane with a thickness of 0.14 mm as a substrate using a filtration method.

Thin gold wires (diameter 0.05 mm) were attached to the film using silver paint in order to connect the gauge to an Ohmmeter. The separation between the contacts was 7 mm, and the width of the gauge film was 3 mm. Since the room temperature resistance of the unstrained gauge was ca. 3 M$\Omega$ and the resistance of the leads was of the order of 1 $\Omega$, a two-point resistance measurement was sufficient.

Figure 12:
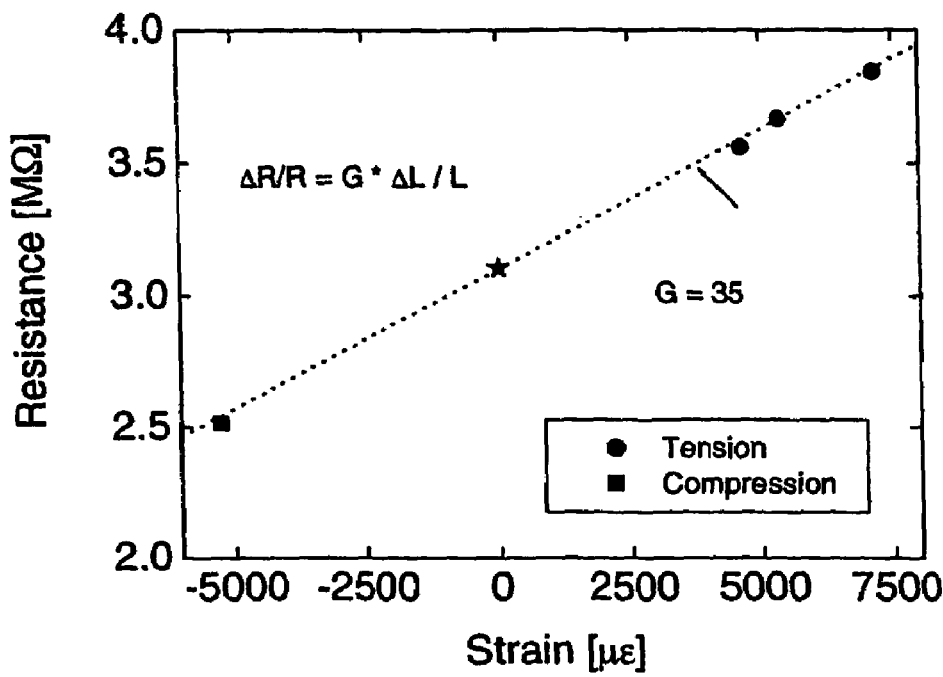
FIG. 12 is a plot of the resistance of a nanoparticle film strain gauge as a function of both compressive and tensile bending strain. The film consists of 8 nm gold nanoparticles cross-linked with an ethanedithiol linker on a flexible nanoporous membrane.

To assess the sensitivity of the nanoparticle tunnel strain gauge, the gauge was attached to surfaces with different radii of curvature, thus exposing the gauge to varying bend strains. Both compressive and tensile strains were applied. FIG. 12 shows the measured resistance as a function of the bend strain. The resistance is an approximately linear function of the strain for strains of up to 7500 $\mu\epsilon$ and behaves reversibly as the strain is reduced and/or reversed. The gauge factor $G=\Delta R/R/\epsilon$ is about 35.

Example 3

Figure 13:
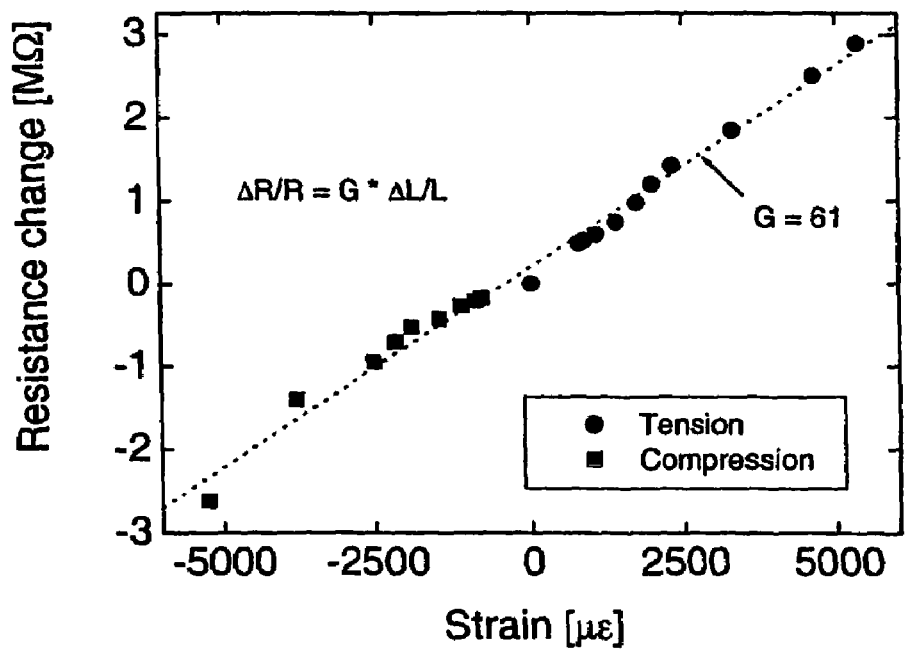
FIG. 13 is a plot of the resistance of a nanoparticle film strain gauge as a function of both compressive and tensile bending strain. The film consists of 18 nm silver nanoparticles with a 4-nitrothiophenol (4-NTP) capping layer on a flexible polyimide substrate.

A tunnel strain gauge similar to the one described in example 1 was produced; however, the nanoparticle concentrate was based on silver nanoparticles with an average diameter of 50 nm instead of gold nanoparticles as in example 1. FIG. 13 shows the measured resistance change as a function of the bend strain. The gauge factor $G=\Delta R/R/\epsilon$ is about 60.

Example 4

A tunnel strain gauge similar to the one described in example 3 was produced; however, the nanoparticle concentrate was based on silver nanoparticles with an average diameter of 50 nm instead of gold nanoparticles as in example 1, and the tunnelling barrier was formed by an inorganic capping layer of silica ($SiO_2$). A gauge factor $G=\Delta R/R/\epsilon$ of about 20 was observed in bending tests similar to those described in example 1.

Example 5

A number of tunnel strain gauges similar to the one described in example 1 were produced; however, before deposition of the nanoparticle film, contact pads for the attachment of leads to connect the gauge to measuring equipment were deposited onto various substrates using different techniques: In one case, the substrate was a 0.1 mm thick polycarbonate sheet, and a 200 nm thick gold on 20 nm chromium film was evaporated onto the substrate before deposition of the nanoparticle film. For another sample, the substrate was a 0.08 mm thick polyimide film coated with a 0.03 mm thick copper layer, and the contact pads were formed by photolithographic patterning and subsequent wet etching of the copper layer before the nanoparticle film was deposited. Gauge factors $G=\Delta R/R/\epsilon$ of about 100 were observed in bending tests similar to those described in example 1.

Example 6

A strain gauge similar to the one described in example 1 was produced; however, before deposition of the nanoparticle film, contact pads for the attachment of leads to connect the gauge to measuring equipment were deposited as follows: The contact pads consisted of the same nanoparticle material as the one used for the strain-sensitive layer but were transformed into a highly conductive metallic state using a heat treatment at 200° C. The necessary patterning of both the contact pads and of the subsequently deposited resistive nanoparticle layer was achieved using shadow masks. A gauge factor $G=\Delta R/R/\epsilon$ of about 100 was observed in bending tests similar to those described in example 1.

Example 7

A tunnel strain gauge similar to the one described in example 1 was produced; however, the gauge assembly was covered with a passivating layer consisting of silicone rubber. A gauge factor $G=\Delta R/R/\epsilon$ of about 100 was observed in bending tests similar to those described in example 1.

Example 8

Assemblies of tunnel strain gauges similar to the one described in example 1 were produced; however, the nanoparticle film layers were deposited using a Canon BubbleJet inkjet printer. The assemblies produced included biaxial rosettes for the measurement of two perpendicular strain components, three-element rosettes for the determination of the principal strains, dual elements in a chevron pattern for direct indication of shear strain, and rectangular arrays of 125 individual gauges.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

REFERENCES

| Patent | Inventor(s) | Title |
|---|---|---|
| U.S. Pat. No. 4732042 | Adams | Cast membrane protected pressure sensor |
| U.S. Pat. No. 4812800 | Fuchs et al. | Strain gauge having a thin discontinuous metal layer |
| U.S. Pat. No. 5512131 | Kumar et al. | Formation of microstamped patterns on surfaces and derivative articles |
| WO 01/25316A1 | Raguse et al. | Three dimensional array films |

Other References

B. Abeles et al., Advances in Physics 24, 407–461 (1975), "Structural and Electrical properties of Granular Films."

M. Alejandro-Arellano et al., Pure and Applied Chemistry 72, 257–267 (2000), "Silica-coated metals and semiconductors. Stabilization and nanostructuring."

J. A. Craighton et al., J. Chem. Soc. Faraday Trans. 2 (75), 790 (1979)

M. D. Musick et al., Langmuir 15 (3), 844–850 (1999), "Electrochemical properties of colloidal Au-based surfaces: Multilayer assemblies and seeded colloid films."

J. Turkevich et al., Discuss. Faraday Soc. 11, 55 (1951),

A. L. Window and G. S. Holister, *Strain Gauge Technology;* Applied Science Publishers, Ltd.: Essex, 1982, pp. 1–38.

The invention claimed is:

1. A method of measuring strain in a surface under test, the method comprising the steps of:
   (i) applying to the surface under test a strain gauge comprising a resistive layer deposited on a nanoporous membrane, the resistive layer comprising metallic or semiconducting functionalised nanoparticles or aggregates thereof in which the functionalised nanoparticies or aggregates thereof are separated by insulating and/or semiconducting material;
   (ii) measuring a change in the resistance of the strain gauge; and
   (iii) determining the strain in the surface under test from the change in resistance of the strain gauge.

2. A method as claimed in claim 1 wherein the insulating and/or semiconducting material comprises self-assembled capping layers of organic molecules surrounding the functionalised nanoparticles or aggregates of functionalised nanoparticles.

3. A method as claimed in claim 1 wherein the insulating and/or semiconducting material comprises organic molecules which cross-link the functionalised nanoparticles or aggregates of functionalised nanoparticles.

4. A method as claimed in claim 1, wherein the insulating and/or semiconducting material comprises capping layers of inorganic molecules surrounding the functionalised nanoparticles or aggregates of functionalised nanoparticles.

5. A method as claimed in claim 1 wherein the functionalised nanoparticles are gold or silver.

6. A method as claimed in claim 1 wherein the resistive layer comprises contact pads for the purpose of attaching leads to connect the gauge to measuring equipment.

7. A method as claimed in claim 1 wherein the strain gauge further comprises an insulating passivation layer.

8. A method according to claim 1 wherein an assembly of said strain gauges is applied to the surface under test and wherein the resistive layer is patterned to form multiple conductors oriented along different directions in the plane of the surface.

9. A method according to claim 1 wherein an assembly of said strain gauges is applied to the surface under test and wherein the resistive layer is patterned to form multiple conductors arranged in a way suitable for mapping the strain distribution in the surface under test.

10. A method according to claim 1 wherein an assembly of said strain gauges is applied to the surface under test and wherein the resistive layer is patterned to form a bridge circuit or part thereof.

11. A method of measuring strain in a surface under test, the method comprising the steps of;
   (i) applying to the surface under test a strain gauge comprising a resistive layer, the resistive layer comprising metallic or semiconducting functionalised nanoparticles or aggregates thereof wherein the nanoparticles or aggregates thereof are functionalised by forming capping layers surrounding the nanoparticles in a sell-assembly process, said capping layers being formed using capping agents selected from the group consisting of monothiol capping agents, mercaptoacetic acid, dithioglycolic acid, alkyl dithiols and organic sulphur compounds;
   (ii) measuring a change in the resistance of the strain gauge; and
   (iii) determining the strain in the surface under test from the change in resistance of the strain gauge.

12. A method according to claim 11, wherein the monothiol capping agent is 4-nitrothiophenol.

* * * * *

UNITED STATES PATENT AND TRADEMARK OFFICE
CERTIFICATE OF CORRECTION

PATENT NO. : 7,116,209 B2  Page 1 of 1
APPLICATION NO. : 10/487597
DATED : October 3, 2006
INVENTOR(S) : Hermann et al.

It is certified that error appears in the above-identified patent and that said Letters Patent is hereby corrected as shown below:

Title page item (73) "Assignees", please change "Commonwealth Scientific and Industrial Research Organization, (AU);" to --Commonwealth Scientific and Industrial Research Organisation, (AU)--.

Title page item 73
Please change "The Commonwealth of Australia as represented by The Defence Science and Technology Organization of the Dept. of Defence, Edinburgh (AU)" to --The Commonwealth of Australia as represented by The Defence Science and Technology Organisation of the Dept. of Defence, Edinburgh (AU)--.

Col. 10, line 39, claim 11, please change "sell-assembly" to --self-assembly--.

Signed and Sealed this

Sixteenth Day of January, 2007

JON W. DUDAS
*Director of the United States Patent and Trademark Office*